Patented Aug. 14, 1945

2,382,889

UNITED STATES PATENT OFFICE 2,382,889

MANUFACTURE OF LACTIC ACID AND SALTS THEREOF

Ritchie Hart Lock, Chigwell, England

No Drawing. Application April 3, 1943, Serial No. 481,761. In Great Britain July 22, 1941

9 Claims. (Cl. 260—528)

This invention relates to the manufacture of lactic acid or salts thereof by the action of alkalies, such as caustic alkalies or alkaline earths, on saccharides belonging to the group of monosaccharides and oligosaccharides.

It is known that salts of lactic acid are among the products which can be obtained by the action of alkalies on saccharides. Theoretically the decomposition of a saccharide to produce lactic acid should require 2 equivalents of alkali per $C_6$-unit of the saccharide and processes have been described in which the saccharide is heated with a quantity of alkali in excess of the theoretical amount.

I have found that it is of advantage to conduct the reaction in such manner as to maintain a considerable excess of alkali over unchanged saccharide in the reaction mixture. For this purpose, in accordance with the invention the saccharide is gradually added, either continuously or periodically in portions, to an alkali metal hydroxide or carbonate or an alkaline earth metal hydroxide contained in a boiling aqueous medium under atmospheric pressure. By the procedure of this invention the quantity of alkali used need not exceed, or appreciably exceed, that theoretically required to produce lactic acid by the decomposition of the total quantity of saccharide added, and the quantity of alkali will be less than that which would be required to produce the same result if the whole of the saccharide were present from the outset of the reaction. Furthermore, in the case of most saccharides it is possible by the process of this invention to obtain a higher yield of lactic acid with a given quantity of saccharide.

For instance, invert sugar, prepared by the inversion of sucrose in the usual manner, may be added drop by drop or in small portions at intervals to a boiling solution of a caustic alkali until about 1 $C_6$-unit has been introduced for each 2 mols of caustic alkali present in the initial solution. Since the initial rate of decomposition under these conditions is high, the greater part of the sugar is decomposed within a very short time, and it is therefore unnecessary to complete the decomposition of each portion before addition of a further portion. It is possible to introduce the total quantity of sugar in the course of, for instance, about 1-3 hours whilst still maintaining throughout a considerable excess of alkali over undecomposed sugar.

After addition of the required quantity of the sugar, heating is continued until the decomposition is more or less finished, whereupon alkali lactate or, after decomposing the lactate, lactic acid is isolated from the reaction solution in known manner.

As saccharides to be used for the production of lactic acid or salts thereof by the present invention there are to be understood monosaccharides and oligosaccharides. As monosaccharides there may be used, for instance, dextrose or the monosaccharides obtained by the hydrolysis of carbohydrates such as starch. As disaccharides, lactose, sucrose or molasses may be used, but in the case of some disaccharides and other oligosaccharides it may be of advantage to decompose them in known manner into monosaccharides before the reaction with alkali.

Caustic alkalies are preferably used as the alkali, but, instead of caustic alkalies, alkali metal carbonates or alkaline earth hydroxides may be used.

By means of the invention it is possible to produce a relatively high yield of lactic acid or lactates without the use of a quantity of alkali appreciably exceeding that theoretically required for decomposition of the total quantity of saccharide added.

Since the solution resulting from the decomposition of the saccharide by a quantity of alkai amounting to 2 equivalents per $C_6$-unit still contains some unconsumed alkali it is possible to add further portions of the saccharide until substantially the whole or a part of this alkali has been consumed. This procedure, however, offers no particular advantage as far as the production of lactic acid or lactates is concerned and it is generally more convenient to discontinue addition of the saccharide when a total quantity amounting to about 1 $C_6$-unit per 2 equivalents of alkali has been introduced.

The following examples illustrate the invention, the parts being by weight unless otherwise stated, and the relationship of parts by weight to parts by volume being the same as that of the kilogram to the litre:

Example 1

34.2 parts (1 mol) of sucrose, dissolved in 100 parts by volume of water, are inverted by treatment with hydrochloric acid in the usual manner, and the reaction solution is neutralised and added drop by drop to a solution of 16 parts (4 mols) of sodium hydroxide in 50 parts by volume of water which is maintained at the boil, the total quantity of invert sugar being added in the course of 3 hours. After addition of the sugar the reaction mixture is maintained at the boil for an hour longer, after which it will contain practically no undecomposed sugar. Sodium lactate may then be isolated from the reaction solution by crystallisation, if necessary after concentration, or the solution may be acidified and the liberated lactic acid recovered by extraction or in some other suitable manner. The yield of lactate or lactic acid is 67 per cent of the theoretical yield.

Example 2

34.2 parts (1 mol) of sucrose are dissolved in water, inverted and neutralised as described in Example 1. The solution of invert sugar is added drop by drop to a suspension of 14.8 parts (2 mols) of calcium hydroxide in 50 parts by volume of water which is maintained at the boil, the total quantity of invert sugar being added in the course of 3 hours. After addition of the sugar the reaction mixture is maintained at the boil for an hour longer, after which it will contain practically no undecomposed sugar. The resulting solution contains 29 per cent of the original quantity of calcium hydroxide. Calcium lactate or lactic acid is recovered from the reaction solution in the manner described in Example 1.

Example 3

36 parts (2 mols) of dextrose are dissolved in 100 parts by volume of water, and the solution is added drop by drop to a solution of 16 parts (4 mols) of sodium hydroxide in 50 parts by volume of water which is maintained at the boil; the total quantity of dextrose being added in the course of 3 hours. After addition of the dextrose the reaction mixture is maintained at the boil for an hour longer, after which 20 per cent of the original quantity of sodium hydroxide remains unchanged. Sodium lactate or lactic acid is recovered as described in Example 1.

Example 4

34.2 parts (1 mol) of lactose are dissolved in 100 parts by volume of water, and the solution is reacted with a solution of sodium hydroxide in the manner described in Example 1. The resulting solution contains unchanged 25 per cent of the original quantity of sodium hydroxide. Sodium lactate or lactic acid is recovered as described in Example 1.

I claim:

1. A process for the manufacture of salts of lactic acid, which comprises gradually adding a saccharide of the group consisting of monosaccharides and oligosaccharides to an alkali of the group consisting of alkali metal hydroxides and carbonates and alkaline earth metal hydroxides contained in a boiling aqueous medium, under atmospheric pressure so as to maintain a considerable excess of alkali over unchanged saccharide in the reaction mixture.

2. A process for the manufacture of salts of lactic acid, which comprises gradually adding a saccharide of the group consisting of monosaccharides and oligosaccharides to an alkali of the group consisting of alkali metal hydroxides and carbonates and alkaline earth metal hydroxides contained in a boiling aqueous medium under atmospheric pressure so as to maintain a considerable excess of alkali over unchanged saccharide in the reaction mixture, the total quantity of saccharide added amounting to about 1 $C_6$-unit for each 2 equivalents of alkali.

3. A process for the manufacture of lactic acid, which comprises gradually adding a saccharide of the group consisting of monosaccharides and oligosaccharides to an alkali of the group consisting of alkali metal hydroxides and carbonates and alkaline earth metal hydroxides contained in a boiling aqueous medium under atmospheric pressure so as to maintain a considerable excess of alkali over unchanged saccharide in the reaction mixture, and converting the resulting salt into lactic acid by treatment with an acid.

4. A process for the manufacture of lactic acid, which comprises gradually adding a saccharide of the group consisting of monosaccharides and oligosaccharides to an alkali of the group consisting of alkali metal hydroxides and carbonates and alkaline earth metal hydroxides contained in a boiling aqueous medium under atmospheric pressure so as to maintain a considerable excess of alkali over unchanged saccharide in the reaction mixture, the total quantity of saccharide added amounting to about 1 $C_6$-unit for each 2 equivalents of alkali, and converting the resulting salt into lactic acid by treatment with an acid.

5. In the process of manufacturing lactic acid and salts thereof, the step of making a lactic acid salt which comprises gradually adding a solution of 2 mols of inverted sucrose under atmospheric pressure to a boiling solution of 4 mols of sodium hydroxide, and, after the whole of the saccharide has been added, maintaining the reaction mixture at the boil until the decomposition is substantially complete.

6. In the process of manufacturing lactic acid and salts thereof, the step of making a lactic acid salt which comprises gradually adding a solution of 2 mols of dextrose under atmospheric pressure to a boiling solution of 4 mols of sodium hydroxide, and, after the whole of the saccharide has been added, maintaining the reaction mixture at the boil until the decomposition is substantially complete.

7. In the process of manufacturing lactic acid and salts thereof, the step of making a lactic acid salt which comprises gradually adding a solution of 1 mol of lactose under atmospheric pressure to a boiling solution of 4 mols of sodium hydroxide, and, after the whole of the saccharide has been added, maintaining the reaction mixture at the boil until the decomposition is substantially complete.

8. In the process of manufacturing a member of the group consisting of alkali metal and alkaline earth metal salts of lactic acid, the step which comprises gradually adding a saccharide of the group consisting of monosaccharides and oligosaccharides to an alkali of the group consisting of alkali metal hydroxides and carbonates and alkaline earth metal hydroxides contained in a boiling aqueous medium under atmospheric pressure so as to maintain a considerable excess of alkali over unchanged saccharide in the reaction mixture.

9. In the process of manufacturing a member of the group consisting of alkali metal and alkaline earth metal salts of lactic acid, the step which comprises gradually adding a saccharide of the group consisting of monosaccharides and oligosaccharides to an alkali of the group consisting of alkali metal hydroxides and carbonates and alkaline earth metal hydroxides contained in a boiling aqueous medium under atmospheric pressure so as to maintain a considerable excess of alkali over unchanged saccharide in the reaction mixture, the total quantity of saccharide added amounting to about 1 $C_6$-unit for each 2 equivalents of alkali.

RITCHIE HART LOCK.